United States Patent
Chen et al.

(10) Patent No.: US 7,826,157 B2
(45) Date of Patent: Nov. 2, 2010

(54) LENS MODULE

(75) Inventors: Liang-Jeng Chen, Taipei (TW); Chen-Hung Wu, Taipei (TW)

(73) Assignee: Skina Optical Co., Ltd., Taipei (TW)

( * ) Notice: Subject to any disclaimer, the term of this patent is extended or adjusted under 35 U.S.C. 154(b) by 2 days.

(21) Appl. No.: 12/348,957

(22) Filed: Jan. 6, 2009

(65) Prior Publication Data

US 2010/0128370 A1    May 27, 2010

(30) Foreign Application Priority Data

Nov. 26, 2008    (TW) ............................. 97145623 A

(51) Int. Cl.
    G02B 7/02    (2006.01)
(52) U.S. Cl. ...................................... 359/824; 359/696
(58) Field of Classification Search .................. 359/694, 359/696, 821–824, 698; 348/345; 396/79, 396/85; 353/100

See application file for complete search history.

(56) References Cited

U.S. PATENT DOCUMENTS 7,227,285 B2 *    6/2007    Osaka ......................... 310/15

* cited by examiner

*Primary Examiner*—Joseph Martinez
(74) *Attorney, Agent, or Firm*—Kile Goekjian Reed & McManus PLLC

(57)    ABSTRACT

A lens module includes an upper coupling element, a spring, a magnet yoke, a plurality of magnets, a coil, a lens holder and a lower coupling element. The magnet yoke is disposed under the spring and has a cylindrical inner wall, multiple extension slices and a top wall. The top wall is outwardly extended from an upper edge of the cylindrical inner wall. The extension slices are downwardly and axially extended from a periphery of the top wall and circumferentially arranged on the top wall at regular intervals. The magnets are attached on inner surfaces of respective extension slices of the magnet yoke. At least two raised structures are circumferentially arranged on the lower periphery of the lens holder. The lower coupling element includes at least two concave structures mating with the raised structures.

20 Claims, 10 Drawing Sheets

LENS MODULE

CROSS-REFERENCE TO RELATED APPLICATION

This application claims priority under 35 U.S.C. §119 to Taiwan Patent Application No. 097145623, filed on Nov. 26, 2008, in the Taiwan Intellectual Property Office, the entire contents of which are hereby incorporated by reference.

FIELD OF THE INVENTION

The present invention relates to a lens module, and more particularly to a lens module that is driven by a voice coil motor.

BACKGROUND OF THE INVENTION

As known, a lens module that is driven by a voice coil motor (VCM) is advantageous for reducing the overall size of the lens module and lowering the product price. Nowadays, the voice coil motor is applied to the lens module having an auto focus function and/or an auto macro function. The auto focus function enables the optical system to obtain correct focus on a subject without requiring the operator to manually adjust focus. The auto macro function allows for close-up shots when the distant from the subject is very short.

FIG. 1 is a schematic exploded view illustrating a lens module that is driven by a voice coil motor according to the prior art. The lens module 10 principally comprises an upper coupling element 11, an upper spring 12, a magnet yoke 13, several magnets 14, a coil 15, a lens holder 16, a cushion 17, a lower spring set 18 including two springs 181 and 182, and a lower coupling element 19.

FIG. 2A is a schematic rear view illustrating the magnet yoke of the lens module shown in FIG. 1. FIG. 2B is a schematic side view of the magnet yoke shown in FIG. 2A taken from the line AA'. FIG. 2C is a schematic partially enlarged view of the magnets shown in FIG. 1. FIG. 3A is a schematic rear view illustrating the lens holder of the lens module shown in FIG. 1. FIG. 3B is a schematic side view of the lens holder shown in FIG. 3A taken from the line BB'. FIG. 4A is a schematic top view illustrating the lower coupling element of the lens module shown in FIG. 1. FIG. 4B is a schematic side view illustrating the retaining post of the lower coupling element shown in FIG. 4A taken from the line CC'.

Hereinafter, the configurations and the operations of the conventional lens module 10 will be illustrated in more details with reference to FIGS. 1, 2, 3 and 4.

As shown in the drawings, several engaging posts 111 are extended downwardly from the edges of the upper coupling element 11 along the axial direction 101. The upper spring 12 is disposed under the upper coupling element 11. An elastic serpentine structure 123 is arranged between a lower inner rim 121 and an upper outer rim 122 of the spring 12. The lower inner rim 121 and the upper outer rim 122 are disposed on different planes in the spatial space.

The magnet yoke 13 is disposed under the upper spring 12. The magnet yoke 13 has an inner wall 131 and an outer wall 132. The inner wall 131 is cylindrical and concentric with the outer wall 132. The magnet yoke 13 is annular and open toward the bottom. The upper end of the magnet yoke 13 is closed by a top wall 133 between the cylindrical inner wall 131 and the outer wall 132. That is, the outer wall 132 is extended downwardly from the periphery of the top wall 133 and encloses the cylindrical inner wall 131. In addition, the axial height of the cylindrical inner wall 131 is smaller than the axial height of the outer wall 132. In other words, the cylindrical inner wall 131, the bottom 1331 of the top wall 133 and the outer wall 132 collectively define an open concave space (as shown in FIGS. 2A and 2B). Moreover, the magnets 14 are attached on the inner surface 1321 of the outer wall 132 of the magnet yoke 13.

The lens holder 16 is tubular and has a thread structure 161 formed on the inner surface thereof, so that a lens (not shown) is fixed onto the thread structure 161. In addition, an annular flange 1621 is circumferentially and outwardly extended from the lower periphery 162 of the lens holder 16 so as to support the coil 15 thereon. The annular flange 1621 has several retaining holes 16211 that are circumferentially arranged at regular intervals. During the lens module 10 is operated, the annular flange 1621 is sustained against the bottom 1311 of the cylindrical inner wall 131 of the magnet yoke 13.

The lower coupling element 19 has several engaging grooves 191 and several retaining posts 193. The engaging grooves 191 mate with the engaging posts 111 of the upper coupling element 11. The retaining posts 193 are disposed on the lower surface 192 of the lower coupling element 19 and mate with the retaining holes 16211 of the lens holder 16. Via the engagement between the engaging grooves 191 and the engaging posts 111 and the engagement between the retaining posts 193 and the retaining holes 16211, the upper coupling element 11, the upper spring 12, the magnet yoke 13 with the attached magnets 14, the lens holder 16 with the supported coil 15, the cushion 17, the lower spring set 18 and the lower coupling element 19 are combined together to assemble the lens module 10.

The position of the lens holder 16 is controlled by applying current through the coil 15. Since the magnets 14 provide a permanent magnetic field, any current passing through the coil 15 will cause a magnetic force to be generated on the coil 15 while moving the lens holder 16 toward the springs. The principles of implementing the auto focus function or the auto macro function by the voice coil motor are known in the art, and are not redundantly described herein.

The lens module having the auto focus function or the auto macro function according to the conventional techniques, however, still has some drawbacks. For example, as shown in FIG. 2B, the magnets 14 have respective arcuate surfaces 141 mating with the four chamfered corners 1322 of the outer wall 132 of the magnet yoke 13 such that the magnets 14 can be attached on the cylindrical inner walls 1321 of the chamfered corners 1322. Since the curvature of the chamfered corner 1322 is difficult to be precisely controlled in the fabricating process, the curvature of the arcuate surface 141 is possibly inconsistent with the curvature of the chamfered corner 1322. Under this circumstance, the magnet 14 fails to be securely attached onto the cylindrical inner wall 1321 of the chamfered corner 1322 and readily falls down. Moreover, since the size of the lens module 10 is very small, the retaining posts 193 are possibly broken during the retaining holes 16211 of the lens holder 16 are coupled with the retaining posts 193. Under this circumstance, the yield of the lens module 10 is decreased. For achieving the coupling efficacy, the retaining hole 16211 should have a sufficient depth. In other words, since the thickness of the annular flange 1621 of the lens holder 16 fails to be considerably reduced, it is detrimental to reduction of the overall size of the lens module.

Therefore, there is a need of providing a lens module that is driven by a voice coil motor so as to obviate the drawbacks encountered from the prior art.

SUMMARY OF THE INVENTION

It is an object of the present invention to provide a lens module that is driven by a voice coil motor and has a simplified magnet yoke.

Another object of the present invention provides a lens module, in which the lens holder and the lower coupling element of the lens module are securely and conveniently combined together.

In accordance with an aspect of the present invention, there is provided a lens module. The lens module includes an upper coupling element, a spring, a magnet yoke, a plurality of magnets, a coil, a lens holder and a lower coupling element. The upper coupling element has multiple engaging posts axially and extended downwardly from edges thereof. The spring is disposed under the upper coupling element, and includes a lower inner rim, an upper outer rim and an elastic serpentine structure between the lower inner rim and the upper outer rim. The magnet yoke is disposed under the spring and has a cylindrical inner wall, multiple extension slices and a top wall. The top wall is outwardly extended from an upper edge of the cylindrical inner wall. The extension slices are downwardly and axially extended from a periphery of the top wall and circumferentially arranged on the top wall at regular intervals. The axial height of the cylindrical inner wall is smaller than that of each extension slice. The magnets are attached on inner surfaces of respective extension slices of the magnet yoke. The lens holder is sheathed by the cylindrical inner wall. The lens holder has a first engaging means formed on an inner surface thereof for fixing a lens. At least one flange is circumferentially and outwardly extended from a lower periphery of the lens holder for supporting the coil. A second engaging means are circumferentially arranged on the lower periphery of the lens holder. The lower coupling element includes multiple engaging grooves mating with the engaging posts and a third engaging means mating with the second engaging means, so that the upper coupling element, the spring, the magnet yoke with the attached magnets, the lens holder with the supported coil and the lower coupling element are combined together to assemble the lens module via the engagement between the engaging grooves and the engaging posts and the engagement between the the engaging means and the second engaging means.

In an embodiment, the spring is a single flat spring, and the lower inner rim, the upper outer rim and the elastic serpentine structure are connected with each other and disposed on the same plane.

In an embodiment, the lens module further includes a second spring arranged between the lens holder and the lower coupling element. The second spring is a single flat spring including a second lower inner rim, a second upper outer rim and a second elastic serpentine structure between the second lower inner rim and the second upper outer rim. The second lower inner rim, the second upper outer rim and the second elastic serpentine structure are connected with each other and disposed on the same plane.

In an embodiment, the cylindrical inner wall, the extension slices and the top wall of the magnet yoke are integrally formed as a one-piece metallic element.

In an embodiment, the multiple extension slices of the magnet yoke include two or four extension slices, which have rectangular shapes and are substantially perpendicular to the top wall and arranged at diametrically opposed locations of the top wall at regular intervals.

In an embodiment, the first engaging means is a thread structure.

In an embodiment, the at least one flange include two or four flanges, which are horizontal protrusions circumferentially and outwardly extended from the lower periphery of the lens holder and arranged at regular intervals for supporting the coil.

In an embodiment, the second engaging means includes at least two raised structures, and the third engaging means includes at least two concave structures mating with the at least two raised structures.

In an embodiment, the second engaging means includes two or six raised structures. The third engaging means includes two or six concave structures mating with the raised structures. The raised structures and the concave structures are bulges and retaining indentations, respectively.

In an embodiment, the magnets attached on the magnet yoke provide a permanent magnetic field. A current passing through the coil causes a magnetic force to be generated on the coil while moving the lens holder toward the magnet yoke, so that the flange is sustained against a bottom of the cylindrical inner wall of the magnet yoke and the lens holder is sustained against and deforms the spring. A restoring force generated by the deformed spring causes the lens holder to return to its original position when the current passing through the coil is ceased.

In accordance with another aspect of the present invention, there is provided a lens module. The lens module includes an upper coupling element, a spring, a magnet yoke, a plurality of magnets, a coil, a lens holder and a lower coupling element. The upper coupling element has multiple engaging posts axially and extended downwardly from edges thereof. The spring is disposed under the upper coupling element, and includes a lower inner rim, an upper outer rim and an elastic serpentine structure between the lower inner rim and the upper outer rim. The magnet yoke is disposed under the spring and has a cylindrical inner wall, an outer wall and a top wall. The top wall is outwardly extended from an upper edge of the cylindrical inner wall. The outer wall is downwardly and axially extended from a periphery of the top wall. The axial height of the cylindrical inner wall is smaller than that of the outer wall. The magnets are attached on an inner surface of the outer wall of the magnet yoke. The lens holder is sheathed by the cylindrical inner wall. The lens holder has an engaging means formed on an inner surface thereof for fixing a lens. At least two flanges are circumferentially and outwardly extended from a lower periphery of the lens holder and arranged at regular intervals for supporting the coil. At least two raised structures are circumferentially arranged on the lower periphery of the lens holder at regular intervals. The lower coupling element includes multiple engaging grooves mating with the engaging posts and at least two concave structures mating with the at least two raised structures, so that the upper coupling element, the spring, the magnet yoke with the attached magnets, the lens holder with the supported coil and the lower coupling element are combined together to assemble the lens module via the engagement between the engaging grooves and the engaging posts and the engagement between the the concave structures and the second raised structures.

In an embodiment, the spring is a single flat spring, and the lower inner rim, the upper outer rim and the elastic serpentine structure are connected with each other and disposed on the same plane.

In an embodiment, the lens module further includes a second spring arranged between the lens holder and the lower coupling element. The second spring is a single flat spring including a second lower inner rim, a second upper outer rim and a second elastic serpentine structure between the second lower inner rim and the second upper outer rim. The second lower inner rim, the second upper outer rim and the second elastic serpentine structure are connected with each other and disposed on the same plane.

In an embodiment, the cylindrical inner wall, the outer wall and the top wall of the magnet yoke are integrally formed as a one-piece metallic element.

In an embodiment, the outer wall comprises multiple extension slices, and the magnets are attached on inner surfaces of respective extension slices of the magnet yoke.

In an embodiment, the multiple extension slices of the magnet yoke include two or four extension slices, which have rectangular shapes and are substantially perpendicular to the top wall and arranged at diametrically opposed locations of the top wall at regular intervals.

In an embodiment, the first engaging means includes a thread structure.

In an embodiment, the at least two flange include two or four flanges, which are horizontal protrusions circumferentially and outwardly extended from the lower periphery of the lens holder and arranged at regular intervals for supporting the coil.

In an embodiment, the at least two raised structures include two or six raised structures. The at least two concave structures include two or six concave structures mating with the raised structures. The raised structures and the concave structures are bulges and retaining indentations, respectively.

In an embodiment, the magnets attached on the magnet yoke provide a permanent magnetic field. A current passing through the coil causes a magnetic force to be generated on the coil while moving the lens holder toward the magnet yoke, so that the flanges are sustained against a bottom of the cylindrical inner wall of the magnet yoke and the lens holder is sustained against and deforms the spring. A restoring force generated by the deformed spring causes the lens holder to return to its original position when the current passing through the coil is ceased.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

It is to be noted that the following descriptions of preferred embodiments of this invention are presented herein for purpose of illustration and description only. It is not intended to be exhaustive or to be limited to the precise form disclosed.

The present invention relates to a lens module that is driven by a voice coil motor. The lens module of the present invention has an auto focus function or an auto macro function.

Figure 5:
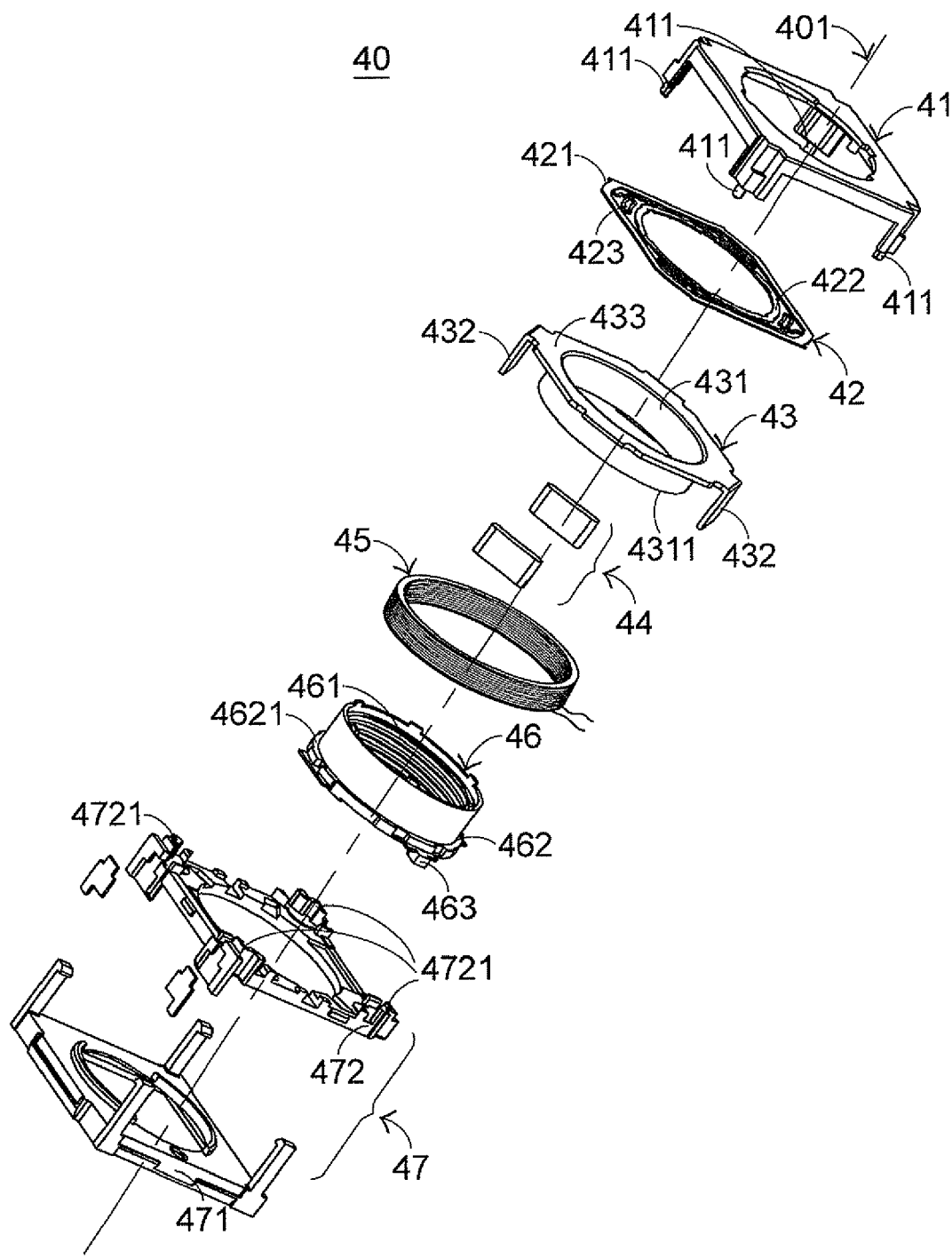
FIG. 5 is a schematic exploded view illustrating a lens module that is driven by a voice coil motor according to a preferred embodiment of the present invention.

FIG. 5 is a schematic exploded view illustrating a lens module that is driven by a voice coil motor according to a preferred embodiment of the present invention. The lens module 40 principally comprises an upper coupling element 41, a spring 42, a magnet yoke 43, several magnets 44, a coil 45, a lens holder 46, and a lower coupling element 47. The lower coupling element 47 includes a lower case 471 and a base 472.

Figure 7A:
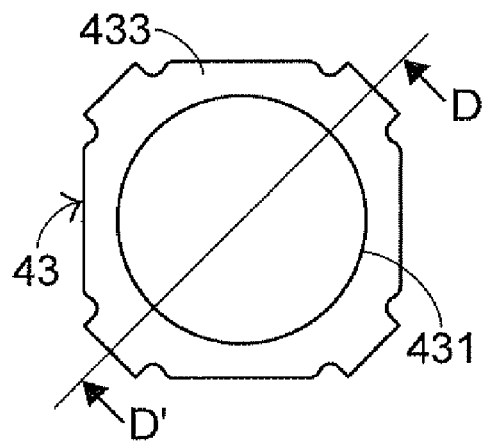
FIG. 7A is a schematic top view illustrating the magnet yoke of the lens module shown in FIG. 5.
Figure 7B:
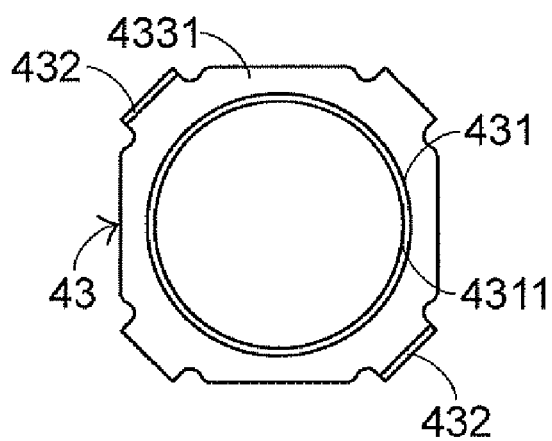
FIG. 7B is a schematic rear view illustrating the magnet yoke of the lens module shown in FIG. 5.
Figure 7C:
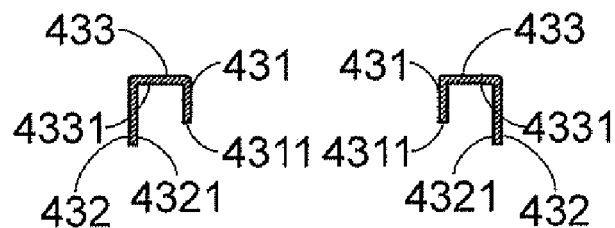
FIG. 7C is a schematic side view of the magnet yoke shown in FIG. 7A taken from the line DD'.
Figure 9A:
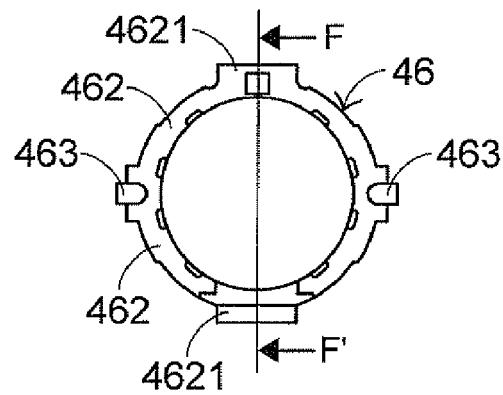
FIG. 9A is a schematic rear view illustrating the lens holder of the lens module shown in FIG. 5.
Figure 9B:
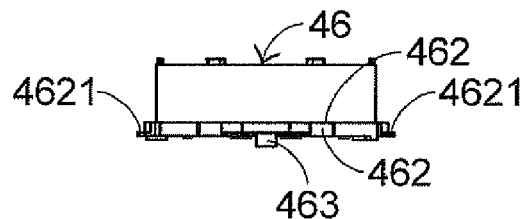
FIG. 9B is a schematic side view of the lens holder shown in FIG. 9A taken from the line FF'.
Figure 10A:
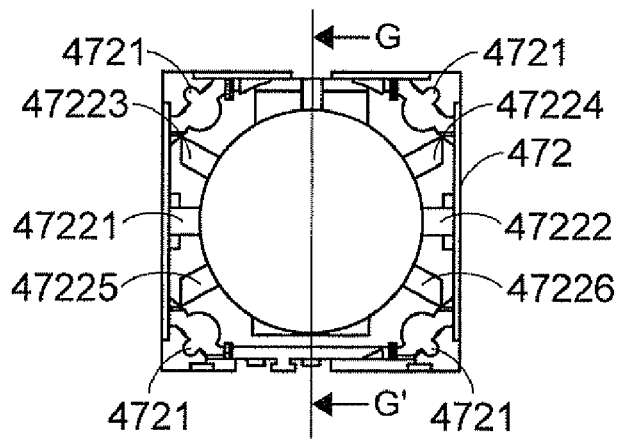
FIG. 10A is a schematic top view illustrating the lower coupling element of the lens module shown in FIG. 5.
Figure 10B:
FIG. 10B is a schematic side view illustrating the lower coupling element shown in FIG. 10A taken from the line GG'.

FIG. 7A is a schematic top view illustrating the magnet yoke of the lens module shown in FIG. 5. FIG. 7B is a schematic rear view illustrating the magnet yoke of the lens module shown in FIG. 5. FIG. 7C is a schematic side view of the magnet yoke shown in FIG. 7A taken from the line DD'. FIG. 9A is a schematic rear view illustrating the lens holder of the lens module shown in FIG. 5. FIG. 9B is a schematic side view of the lens holder shown in FIG. 9A taken from the line FF'. FIG. 10A is a schematic top view illustrating the lower coupling element of the lens module shown in FIG. 5. FIG. 10B is a schematic side view illustrating the lower coupling element shown in FIG. 10A taken from the line GG'.

Hereinafter, the configurations and the operations of the lens module 40 will be illustrated in more details with reference to FIGS. 5, 7, 9 and 10.

As shown in the drawings, several engaging posts 411 are extended downwardly from the edges of the upper coupling element 41 along the axial direction 401. The spring 42 is a single flat spring and disposed under the upper coupling element 41. An elastic serpentine structure 423 is arranged between a lower inner rim 421 and an upper outer rim 422 of the spring 42. The lower inner rim 421, the upper outer rim 422 and the elastic serpentine structure 423 are connected with each other and disposed on the same plane.

The magnet yoke 43 is disposed under the spring 42. The magnet yoke 43 has a cylindrical inner wall 431, a plurality of extension slices 432 and a top wall 433. The top wall 433 is outwardly extended from the upper edge of the cylindrical inner wall 431. The extension slices 432 are extended downwardly from the periphery of the top wall 433 along the axial direction 401 such that the extension slices 432 are concentric with the cylindrical inner wall 431 and circumferentially arranged on the top wall 433 at regular intervals. In addition, the axial height of the cylindrical inner wall 431 is smaller than the axial height of each extension slice 432.

Moreover, the magnets 44 are attached on the inner surfaces 4321 of the extension slices 432 of the magnet yoke 43. In other words, the cylindrical inner wall 431, the bottom 4331 of the top wall 433 and the extension slices 432 collectively define an open concave space (as shown in FIGS. 7A, 7B and 7C).

Figure 6A:
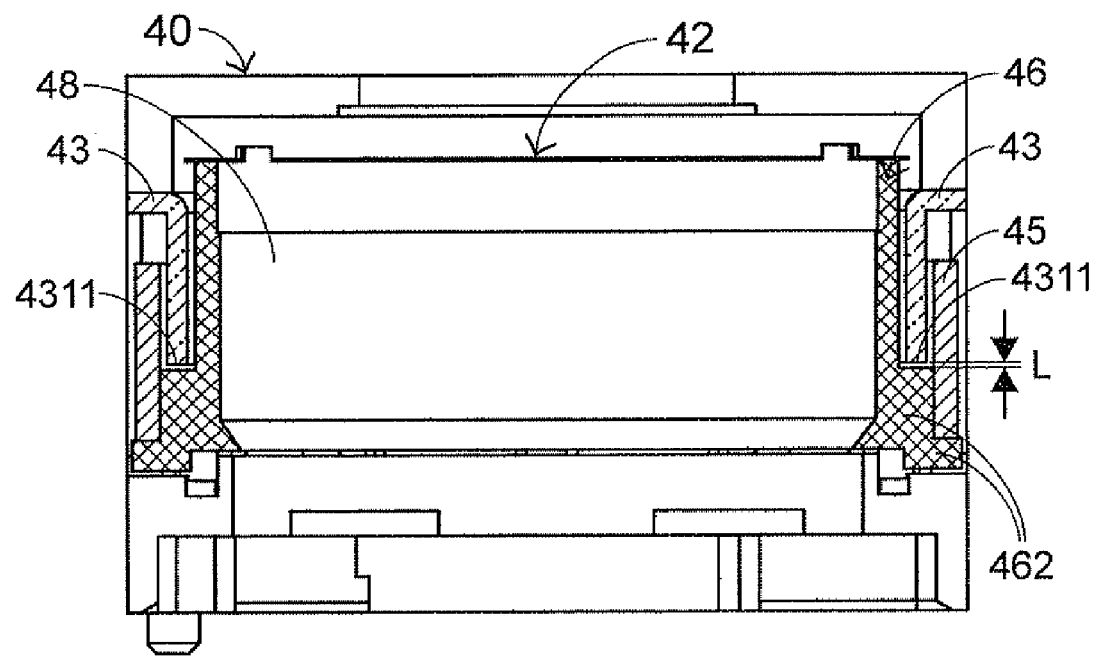
FIGS. 6A and 6B are schematic cross-sectional views illustrating the actions of implementing an auto macro function by using the lens module of the present invention.

The lens holder 46 is tubular and has a thread structure 461 formed on the inner surface thereof, so that a lens 48 (as shown in FIG. 6A) is fixed onto the thread structure 461. At least two flanges 4621 are circumferentially and outwardly extended from the lower periphery 462 of the lens holder 46 and arranged at regular intervals. As such, the coil 45 is sheathed around the lens holder 46 and supported on the flanges 4621. In addition, at least two raised structures 463 are circumferentially arranged on the lower periphery 462 of the lens holder 46 at regular intervals.

The base 472 of the lower coupling element 47 has several engaging grooves 4721 and at least two concave structures 47221 and 47222. The engaging grooves 4721 mate with the engaging posts 411 of the upper coupling element 41. The concave structures 47221 and 47222 mate with the raised structures 463 of the lens holder 46. Via the engagement between the engaging grooves 4721 and the engaging posts 411 and the engagement between the concave structures 47221, 47222 and the raised structures 463, the upper coupling element 41, the spring 42, the magnet yoke 43 with the attached magnets 44, the lens holder 46 with the supported coil 45 and the lower coupling element 47 are combined together to assemble the lens module 40 of the present invention.

It is preferred that the cylindrical inner wall 431, the extension slices 432 and the top wall 433 of the magnet yoke 43 are integrally formed as a one-piece metallic element.

Moreover, the extension slices 432 of the magnet yoke 43 have rectangular shapes and are substantially perpendicular to the top wall 433. In this embodiment, the magnet yoke 43 has two extension slices 432 which are arranged at two diametrically opposed locations of the top wall 433. Since the procedures of making the chamfered corners of the magnet yoke and creating the arcuate surface of the magnets are omitted, the magnets 44 can be securely attached onto the inner surfaces 4321 of the extension slices 432 and the lens module of the present invention is more cost-effective.

Figure 8A:
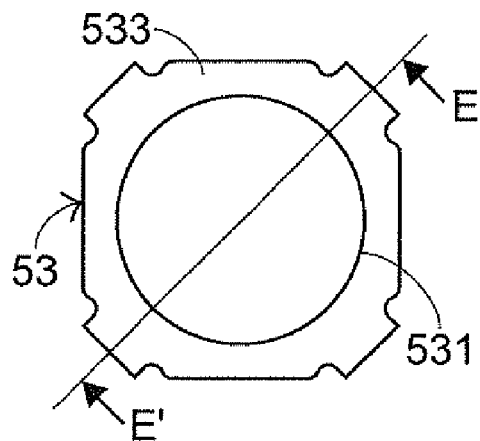
FIG. 8A is a schematic top view illustrating another exemplary magnet yoke used in the lens module of the present invention.
Figure 8B:
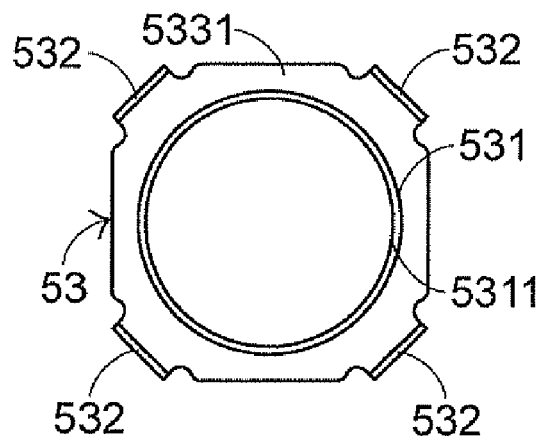
FIG. 8B is a schematic rear view of the magnet yoke shown in FIG. 8A.
Figure 8C:
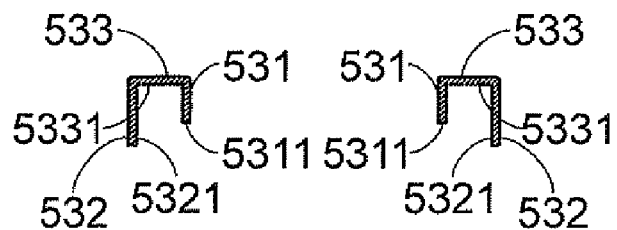
FIG. 8C is a schematic side view of the magnet yoke shown in FIG. 8A taken from the line EE'.

In some embodiments, the magnet yoke may include more than two extension slices. FIG. 8A is a schematic top view illustrating another exemplary magnet yoke used in the lens module of the present invention. FIG. 8B is a schematic rear view of the magnet yoke shown in FIG. 8A. FIG. 8C is a schematic side view of the magnet yoke shown in FIG. 8A taken from the line EE'.

Please refer to FIGS. 8A, 8B and 8C as well as FIG. 5. The magnet yoke 53 is also disposed under the upper spring 42. The magnet yoke 53 has a cylindrical inner wall 531, four extension slices 532 and a top wall 533. The top wall 533 is outwardly extended from the upper edge of the cylindrical inner wall 531. The extension slices 532 are extended downwardly from the periphery of the top wall 533 along the axial direction 401 such that the extension slices 532 are concentric with the cylindrical inner wall 531 and circumferentially arranged on the top wall 533 at regular intervals. In addition, the axial height of the cylindrical inner wall 531 is smaller than the axial height of each extension slice 532.

Please refer to FIGS. 9A and 9B again. Each of the flanges 4621 of the lens holder 46 is substantially a horizontal protrusion. The flanges 4621 are circumferentially and outwardly extended from the lower periphery 462 of the lens holder 46 and arranged at regular intervals. In this embodiment, the lens holder 46 has two flanges 4621. Alternatively, the lens holder 46 may have more than two (e.g. four) flanges 4621.

In this embodiment, the raised structures 463 of the lens holder 46 include two bulges, and the concave structures 47221 and 47222 include two retaining indentations. In some embodiments, the base 472 of the lower coupling element 47 has more than two (e.g. six) concave structures and the lens holder 46 has more than two (e.g. six) raised structures.

Figure 11A:
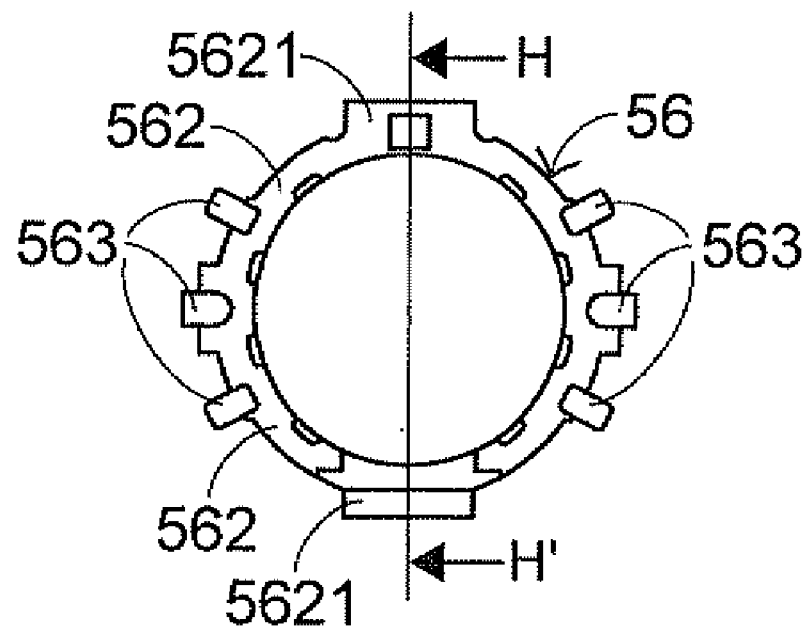
FIG. 11A is a schematic rear view illustrating another exemplary the lens holder used in the lens module of the present invention.
Figure 11B:
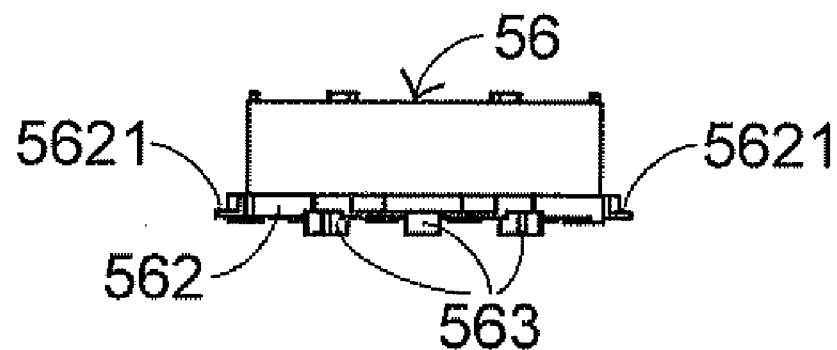
FIG. 11B is a schematic side view of the lens holder shown in FIG. 11A taken from the line HH'.

FIG. 11A is a schematic rear view illustrating another exemplary the lens holder used in the lens module of the present invention. FIG. 11B is a schematic side view of the lens holder shown in FIG. 11A taken from the line HH'. Please refer to FIGS. 11A and 11B. The lens holder 46 has a thread structure (not shown) formed on the inner surface thereof, so that a lens 48 (as shown in FIG. 6A) is fixed onto the thread structure. At least two flanges 5621 are circumferentially and outwardly extended from the lower periphery 562 of the lens holder 56 and arranged at regular intervals. As such, the coil 45 is sheathed around the lens holder 56 and supported on the flanges 5621. In addition, six raised structures 563 are circumferentially arranged on the lower periphery 562 of the lens holder 56 at regular intervals. The six raised structures 563 mate with the six concave structures 47221~47226 of the lower coupling element 47 (as shown in FIG. 10A). As such, the upper coupling element 41, the spring 42, the magnet yoke 43 with the attached magnets 44, the lens holder 56 with the supported coil 45 and the lower coupling element 47 are combined together to assemble the lens module of the present invention.

Figure 6B:
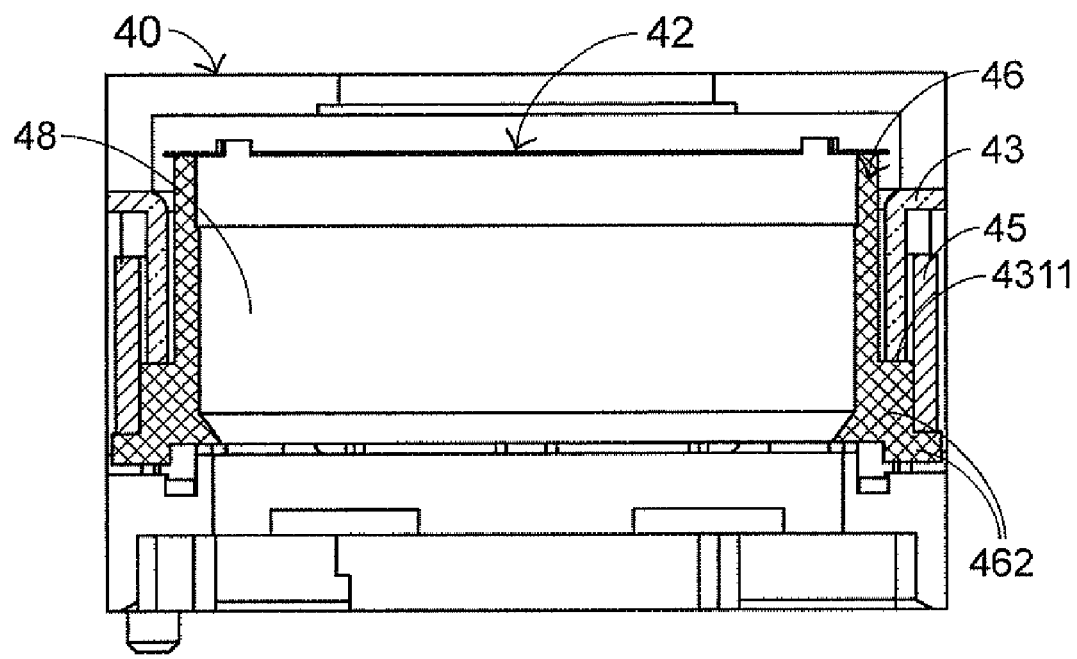

Hereinafter, the principles of implementing the auto macro function will be illustrated with reference to FIGS. 6A and 6B. In a case that no current passes through the coil 45, the flanges 4621 of the lens holder 46 are slightly separated from the bottom 4311 of the cylindrical inner wall 431 of the magnet yoke 43 such that a gap L is existed between the flange 4621 and the bottom 4311 of the cylindrical inner wall 431 (as shown in FIG. 6A). The position of the lens holder 46 is controlled by applying current through the coil 45. Since the magnets 44 provide a permanent magnetic field, any current passing through the coil 45 will cause a magnetic force to be generated on the coil 45 while moving the lens holder moved toward the magnet yoke 43. As such, the flanges 4621 are sustained against the bottom 4311 of the cylindrical inner wall 431 of the magnet yoke 43 (as shown in FIG. 6B). At the same time, the top edge of the lens holder 46 is sustained against the spring 42 and thus the spring 42 is subject to deformation.

Once the current passing through the coil 45 is ceased, the restoring force generated by the deformed spring 42 will cause the lens holder to return to its original position (as shown in FIG. 6A).

Figure 1:
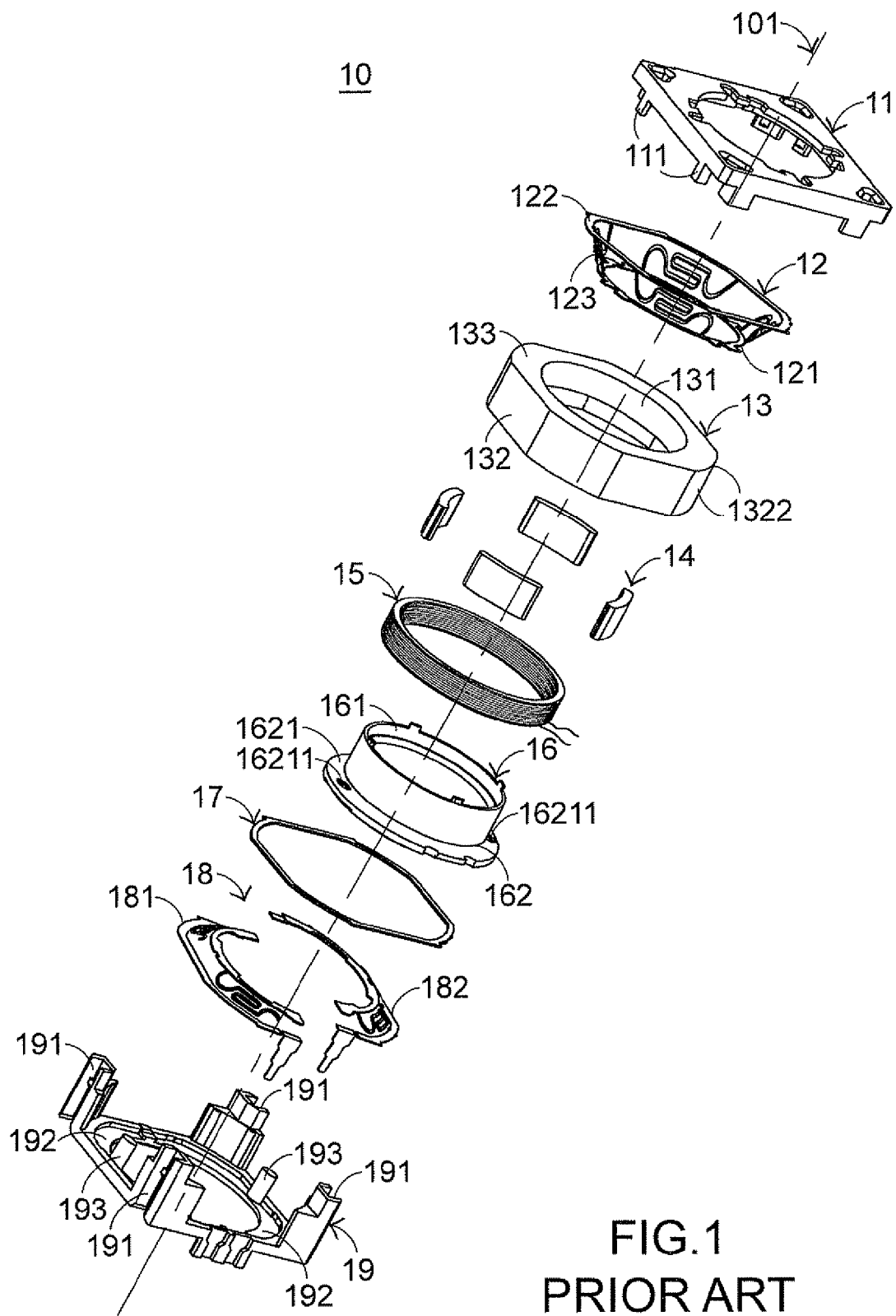
FIG. 1 is a schematic exploded view illustrating a lens module that is driven by a voice coil motor according to the prior art.
Figure 2A:
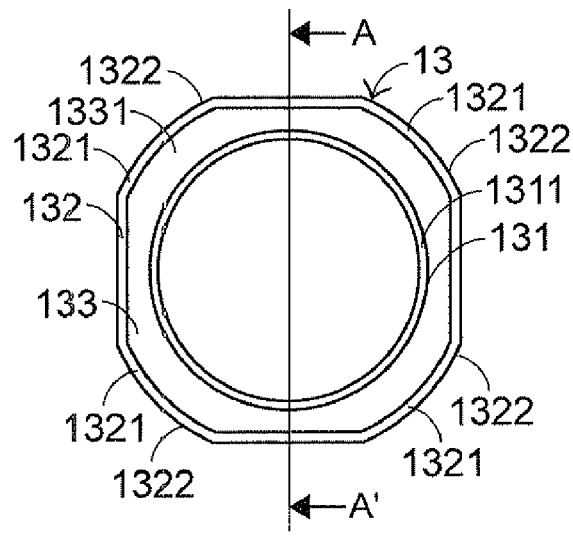
FIG. 2A is a schematic rear view illustrating the magnet yoke of the lens module shown in FIG. 1.
Figure 2B:
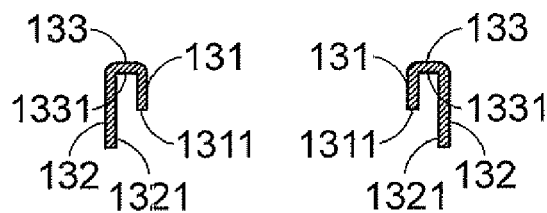
FIG. 2B is a schematic side view of the magnet yoke shown in FIG. 2A taken from the line AA'.
Figure 2C:
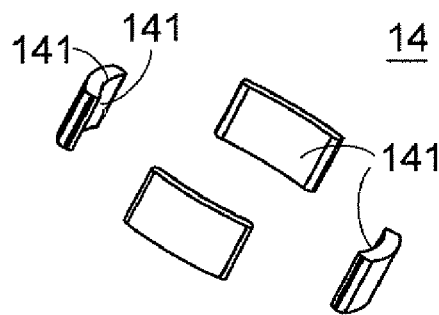
FIG. 2C is a schematic partially enlarged view of the magnets shown in FIG. 1.
Figure 3A:
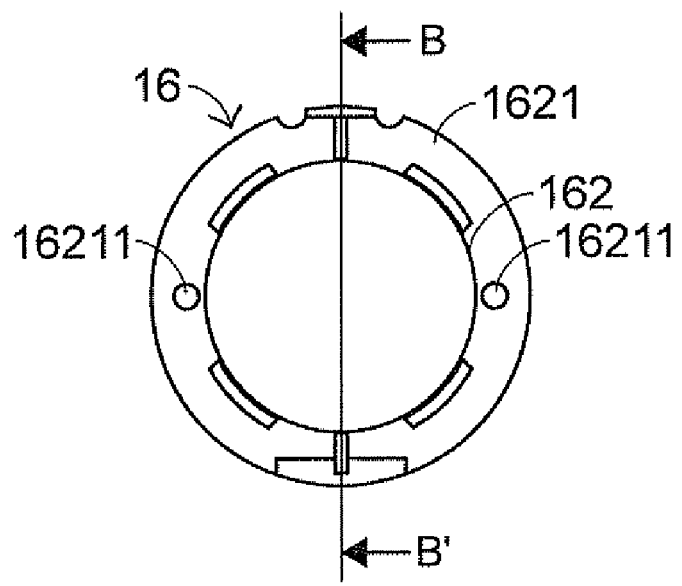
FIG. 3A is a schematic rear view illustrating the lens holder of the lens module shown in FIG. 1.
Figure 3B:
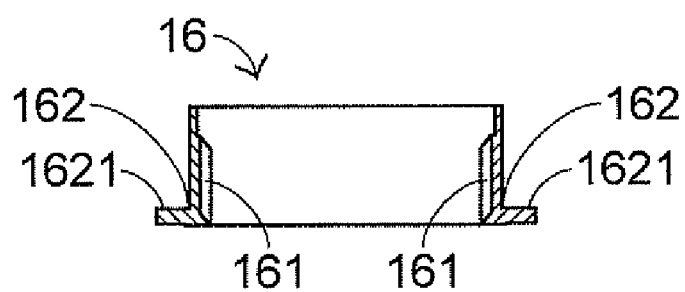
FIG. 3B is a schematic side view of the lens holder shown in FIG. 3A taken from the line BB'.
Figure 4A:
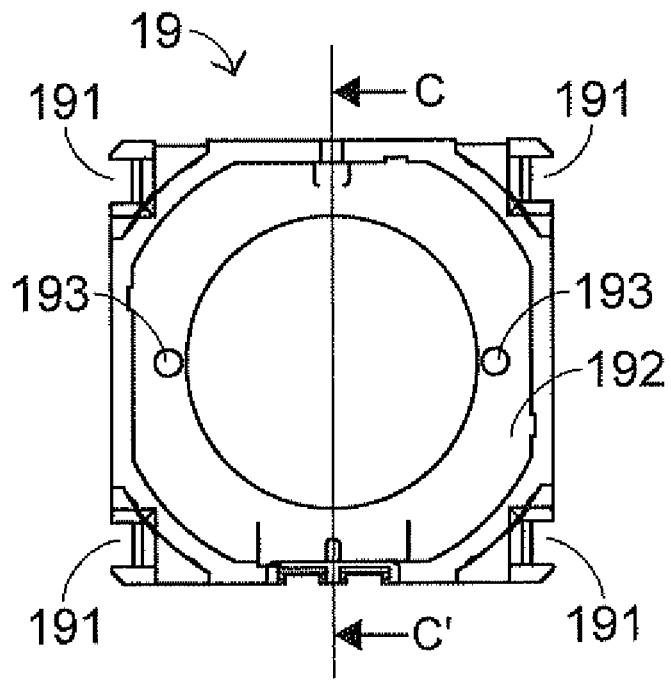
FIG. 4A is a schematic rear view illustrating the lower coupling element of the lens module shown in FIG. 1.
Figure 4B:
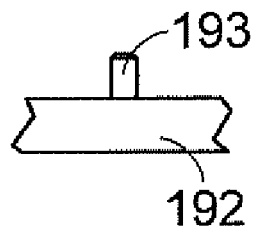
FIG. 4B is a schematic side view illustrating the retaining post of the lower coupling element shown in FIG. 4A taken from the line CC'.

It is noted that, however, those skilled in the art will readily observe that numerous modifications and alterations may be made while retaining the teachings of the invention. For example, the magnet yoke 13 of FIG. 1 may cooperate with the lens holder 46 and the lower coupling element 47 of FIG. 5. Alternatively, the magnet yoke 43 of FIG. 5 may cooperate with the lens holder 16 and the lower coupling element 19 of FIG. 1.

The above embodiments are illustrated by referring to a lens module having an auto macro function. Nevertheless, the concepts of the present invention can be expanded to a lens module having an auto focus function. For assembling the autofocus lens module, an additional spring is arranged between the lens holder 46 and the lower coupling element 47. Such an additional spring (not shown) is also a single flat spring including a lower inner rim, an upper outer rim and an elastic serpentine structure between the lower inner rim and the upper outer rim, wherein the lower inner rim, the upper outer rim and the elastic serpentine structure are connected with each other and disposed on the same plane.

From the above description, it is found that the lens module of the present invention has a simplified magnet yoke. In addition, the lens holder and the lower coupling element of the lens module are securely and conveniently combined together As a consequence, the process of assembling the lens module is simplified and the lens module is more cost-effective in comparison with the conventional lens module.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lens module comprising:
    an upper coupling element having multiple engaging posts axially and extended downwardly from edges thereof;
    a spring disposed under said upper coupling element, and comprising a lower inner rim, an upper outer rim and an elastic serpentine structure between said lower inner rim and said upper outer rim;
    a magnet yoke disposed under said spring and having a cylindrical inner wall, multiple extension slices and a top wall, wherein said top wall is outwardly extended from an upper edge of said cylindrical inner wall, said extension slices are downwardly and axially extended from a periphery of said top wall and circumferentially arranged on said top wall at regular intervals, and the axial height of said cylindrical inner wall is smaller than that of each extension slice;
    a plurality of magnets attached on inner surfaces of respective extension slices of said magnet yoke, wherein said plurality of magnets and said inner surfaces of respective extension slices are flat;
    a coil;
    a lens holder sheathed by said cylindrical inner wall, wherein said lens holder has a first engaging means formed on an inner surface thereof for fixing a lens, at least one flange is circumferentially and outwardly extended from a lower periphery of said lens holder for supporting said coil, and a second engaging means are circumferentially arranged on said lower periphery of said lens holder; and
    a lower coupling element comprising multiple engaging grooves mating with said engaging posts and a third engaging means mating with said second engaging means, so that said upper coupling element, said spring, said magnet yoke with said attached magnets, said lens holder with said supported coil and said lower coupling element are combined together to assemble said lens module via the engagement between said engaging grooves and said engaging posts and the engagement between the said engaging means and said second engaging means.

2. The lens module according to claim 1 wherein said spring is a single flat spring, and said lower inner rim, said upper outer rim and said elastic serpentine structure are connected with each other and disposed on the same plane.

3. The lens module according to claim 1 further comprising a second spring arranged between said lens holder and said lower coupling element, wherein said second spring is a single flat spring comprising a second lower inner rim, a second upper outer rim and a second elastic serpentine structure between said second lower inner rim and said second upper outer rim, and said second lower inner rim, said second upper outer rim and said second elastic serpentine structure are connected with each other and disposed on the same plane.

4. The lens module according to claim 1 wherein said cylindrical inner wall, said extension slices and said top wall of said magnet yoke are integrally formed as a one-piece metallic element.

5. The lens module according to claim 1 wherein said multiple extension slices of said magnet yoke include two or four extension slices, which have rectangular shapes and are substantially perpendicular to said top wall and arranged at diametrically opposed locations of said top wall at regular intervals.

6. The lens module according to claim 1 wherein said first engaging means includes a thread structure.

7. The lens module according to claim 1 wherein said at least one flange include two or four flanges, which are horizontal protrusions circumferentially and outwardly extended from said lower periphery of said lens holder and arranged at regular intervals for supporting said coil.

8. The lens module according to claim 1 wherein said second engaging means includes at least two raised structures radially extended from said lower periphery of said lens holder, and said third engaging means includes at least two concave structures mating with said at least two raised structures.

9. The lens module according to claim 8 wherein said second engaging means includes two or six raised structures, said third engaging means includes two or six concave structures mating with said raised structures, and said raised structures and said concave structures are bulges and retaining indentations, respectively.

10. The lens module according to claim 1 wherein said magnets attached on said magnet yoke provide a permanent magnetic field, a current passing through said coil causes a magnetic force to be generated on said coil while moving said lens holder moved toward said magnet yoke, so that said flange is sustained against a bottom of said cylindrical inner wall of said magnet yoke and said lens holder is sustained against and deforms said spring, wherein a restoring force generated by said deformed spring causes said lens holder to return to its original position when said current passing through said coil is ceased.

11. A lens module comprising:
an upper coupling element having multiple engaging posts axially and extended downwardly from edges thereof;
a spring disposed under said upper coupling element, and comprising a lower inner rim, an upper outer rim and an elastic serpentine structure between said lower inner rim and said upper outer rim;
a magnet yoke disposed under said spring and having a cylindrical inner wall, an outer wall and a top wall, wherein said top wall is outwardly extended from an upper edge of said cylindrical inner wall, said outer wall is downwardly and axially extended from a periphery of said top wall, and the axial height of said cylindrical inner wall is smaller than that of said outer wall;
a plurality of magnets attached on an inner surface of said outer wall of said magnet yoke, wherein said plurality of magnets and said inner surface of said outer wall of said magnet yoke are flat;
a coil;
a lens holder sheathed by said cylindrical inner wall, wherein said lens holder has an engaging means formed on an inner surface thereof for fixing a lens, at least two flanges are circumferentially and outwardly extended from a lower periphery of said lens holder and arranged at regular intervals for supporting said coil, and at least two raised structures are circumferentially arranged on said lower periphery of said lens holder at regular intervals, and radially extended from said lower periphery of said lens holder; and
a lower coupling element comprising multiple engaging grooves mating with said engaging posts and at least two concave structures mating with said at least two raised structures, so that said upper coupling element, said spring, said magnet yoke with said attached magnets, said lens holder with said supported coil and said lower coupling element are combined together to assemble said lens module via the engagement between said engaging grooves and said engaging posts and the engagement between the said concave structures and said second raised structures.

12. The lens module according to claim 11 wherein said spring is a single flat spring, and said lower inner rim, said upper outer rim and said elastic serpentine structure are connected with each other and disposed on the same plane.

13. The lens module according to claim 11 further comprising a second spring arranged between said lens holder and said lower coupling element, wherein said second spring is a single flat spring comprising a second lower inner rim, a second upper outer rim and a second elastic serpentine structure between said second lower inner rim and said second upper outer rim, and said second lower inner rim, said second upper outer rim and said second elastic serpentine structure are connected with each other and disposed on the same plane.

14. The lens module according to claim 11 wherein said cylindrical inner wall, said outer wall and said top wall of said magnet yoke are integrally formed as a one-piece metallic element.

15. The lens module according to claim 11 wherein said outer wall comprises multiple extension slices, and said magnets are attached on inner surfaces of respective extension slices of said magnet yoke.

16. The lens module according to claim 15 wherein said multiple extension slices of said magnet yoke include two or four extension slices, which have rectangular shapes and are substantially perpendicular to said top wall and arranged at diametrically opposed locations of said top wall at regular intervals.

17. The lens module according to claim 11 wherein said engaging means includes a thread structure.

18. The lens module according to claim 11 wherein said at least two flange include two or four flanges, which are horizontal protrusions circumferentially and outwardly extended from said lower periphery of said lens holder and arranged at regular intervals for supporting said coil.

19. The lens module according to claim 11 wherein said at least two raised structures include two or six raised structures, said at least two concave structures include two or six concave structures mating with said raised structures, and said raised structures and said concave structures are bulges and retaining indentations, respectively.

20. The lens module according to claim 11 wherein said magnets attached on said magnet yoke provide a permanent magnetic field, a current passing through said coil causes a magnetic force to be generated on said coil while moving said lens holder toward said magnet yoke, so that said flanges are sustained against a bottom of said cylindrical inner wall of said magnet yoke and said lens holder is sustained against and deforms said spring, wherein a restoring force generated by said deformed spring causes said lens holder to return to its original position when said current passing through said coil is ceased.

* * * * *